(12) United States Patent
Keener et al.

(10) Patent No.: US 7,655,320 B2
(45) Date of Patent: *Feb. 2, 2010

(54) SURFACE PRE-TREATMENT METHOD FOR PRE-COATED HEAT-TREATABLE, PRECIPITATION-HARDENABLE STAINLESS STEEL FERROUS-ALLOY COMPONENTS AND COMPONENTS COATED THEREBY

(75) Inventors: Steven G. Keener, Trabuco Canyon, CA (US); Michael A. Mendoza, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 640 days.

This patent is subject to a terminal disclaimer.

(21) Appl. No.: 10/982,938

(22) Filed: Nov. 5, 2004

(65) Prior Publication Data

US 2005/0118337 A1 Jun. 2, 2005

Related U.S. Application Data

(62) Division of application No. 10/374,700, filed on Feb. 25, 2003, now abandoned.

(51) Int. Cl.
*B32B 15/098* (2006.01)
*C21D 9/00* (2006.01)
(52) U.S. Cl. ............... 428/626; 428/457; 427/384; 148/537
(58) Field of Classification Search ............. 428/624, 428/626, 681, 684, 685, 215, 336, 332, 457, 428/422, 460, 658, 659, 613, 551, 657
See application file for complete search history.

(56) References Cited

U.S. PATENT DOCUMENTS

| | | | |
|---|---|---|---|
| 4,659,268 | A | 4/1987 | Del Mundo et al. |
| 4,717,302 | A | 1/1988 | Adams et al. |
| 4,778,637 | A | 10/1988 | Adams et al. |
| 4,861,211 | A | 8/1989 | Dunsmore |
| 4,868,066 | A | 9/1989 | Whitmore |
| 4,971,635 | A | 11/1990 | Guhde et al. |
| 5,614,037 | A | 3/1997 | Keener |
| 5,858,133 | A | 1/1999 | Keener |
| 5,922,472 | A | 7/1999 | Keener |
| 5,944,918 | A | 8/1999 | Keener |
| 6,171,649 | B1 | 1/2001 | Keener et al. |
| 6,235,407 | B1 * | 5/2001 | Ogata et al. ............. 428/626 |
| 6,274,200 | B1 | 8/2001 | Keener et al. |
| 6,494,972 | B1 | 12/2002 | Keener et al. |
| 6,499,926 | B2 | 12/2002 | Keener |
| 6,953,509 | B2 | 10/2005 | Keener |
| 7,128,949 | B2 * | 10/2006 | Keener et al. ............ 427/385.5 |

FOREIGN PATENT DOCUMENTS

| | | |
|---|---|---|
| DE | 196 25 548 | 1/1998 |
| EP | 0 342 976 A1 | 11/1989 |

* cited by examiner

*Primary Examiner*—John J Zimmerman
(74) *Attorney, Agent, or Firm*—Alston & Bird LLP

(57) ABSTRACT

The present invention relates to the use, in a pre-coating process, of a flash plating, without a subsequent chromate seal, as a surface pre-treatment for a ferrous-alloy substrate prior to applying a corrosion-inhibiting coating to improve the overall corrosion protection of the pre-treatment component. Preferably the ferrous alloy is a heat-treatable, precipitation-hardenable stainless steel and the pre-treatement is a cadmium flash plate or a zinc-nickel alloy flash plate.

4 Claims, 3 Drawing Sheets

SURFACE PRE-TREATMENT METHOD FOR PRE-COATED HEAT-TREATABLE, PRECIPITATION-HARDENABLE STAINLESS STEEL FERROUS-ALLOY COMPONENTS AND COMPONENTS COATED THEREBY

CROSS-REFERENCE TO RELATED APPLICATIONS

This application is a division of U.S. application Ser. No. 10/374,700, filed Feb. 25, 2003, now abandoned which is hereby incorporated herein in its entirety by reference.

BACKGROUND OF THE INVENTION

This invention relates to the preparation of pre-coated ferrous-alloy components. More particularly, the present invention relates to the use of a surface preparation as a preliminary step in a pre-coating process to improve the corrosion protection and other properties of coated ferrous-alloy components.

Aircraft manufacturers use a variety of different ferrous and non-ferrous metals in the fabrication of aircraft components. Commonly assigned U.S. Pat. No. 5,614,037 discloses a method for pre-treating aluminum and aluminum-alloy articles to obviate the use of wet sealants and other coatings for protection against corrosion damage.

Ferrous alloys such as carbon steels and aircraft-quality low-alloy stainless steels, such as, for example, Aermet 100, HY-TUF™, 300M, H-11, HP9-4-30, 52100, 1095, 4130, 4135, 4140, 4330V, 4340, 6150, 8740, 18-8, 17-4PH, 17-7PH, 15-5PH, PH 13-8Mo, PH 15-7Mo, A-286, etc. are often used as primary structural aircraft components. Typically, these ferrous-alloy components, including fasteners, bearing, struts, etc., are often protected from wear and corrosion by applying an overplate of cadmium alone or in time-consuming combination with other protective finishes such as chrome plate. These fasteners are often installed using a labor-intensive, time-consuming, and, consequently, very costly wet-sealant process.

However, cadmium is suspected of being a carcinogen and is a known toxic element. Cadmium and cyanide, used in the electrodeposition of cadmium, have been listed as two of the seventeen chemicals targeted by the U.S. Environmental Protection Agency (EPA) for reduction. Additionally, many cadmium-plating specifications require a chromate coating or other subsequent finish to improve corrosion resistance. This adds another toxic metal (hexavalent chromium) that must be treated before discharge. Many European nations have passed legislation restricting import of products with cadmium, and the European Economic Community (EEC) has prohibited use of cadmium-plated products. Such concerns have resulted in the search for a replacement coating or finish.

Although several candidate coatings have been identified, no single replacement coating or system has been found that meets all of the engineering requirements. Earlier tests that formed the foundation for the recently issued patent demonstrated an equivalent level, if not improved, of corrosion protection was achieved by pre-coating ferrous-alloy components in lieu of the inferior practice of applying wet sealant to the component during its assembly. See commonly assigned U.S. Pat. Nos. 6,274,200 and 6,494,972.

However, it has been shown that, with respect to pre-coated components having different ferrous-alloy substrate materials, while the surrounding structural components are adequately protected to equivalent levels from corrosion attack, the coating itself that is applied to some of the components in known pre-coating processes may be adversely affected from an appearance standpoint and may interact to a degree that is visually perceptible. Over a prolonged period of time, the possibility exists that the adverse effect of this interaction could not only manifest itself in the coating's visual appearance but may also have an effect on the coating's integrity, possibly leading to a compromised corrosion protection condition.

SUMMARY OF THE PRESENT INVENTION

The present invention is related to the discovery that, by utilizing a particularly selected surface pre-treatment process for heat-treatable, precipitation-hardenable stainless steel ferrous-alloy components prior to applying a corrosion-inhibiting coating, a significantly improved, pre-determined, final coated condition can be achieved. This improved or enhanced final condition results from the improved compatibility or inter-relationship afforded by the pre-treatment process between the compositions of the subsequently applied protective coating and the component substrate yielding an improved pre-coated component.

More specifically, the present invention relates to the use, in a pre-treatment process, of a flash plating without a chromate seal as a surface treatment for a ferrous-alloy substrate prior to applying a corrosion-inhibiting coating to improve the overall corrosion protection of the pre-treatment process. Preferably the flash plating is either a cadmium flash plate or a zinc-nickel (Zn—Ni) alloy flash plate coating.

In addition, the present invention relates to a method for coating a ferrous-alloy aircraft structural component comprising the steps of providing an aircraft structural component made from a ferrous-alloy precursor having a pre-determined heat-treatment temperature and subjecting the component to a flash plate pre-treatment. The flash plate-treated component is optionally subjected to a hardening treatment. A curable organic coating material is provided having a non-volatile portion that is curable at about the predetermined ferrous-alloy heat-treatment temperature, and is applied to the component. The coating and the component are substantially simultaneously cured by heat-treating the ferrous-alloy precursor. Cadmium (Cd) flash plating pre-treatment is applied per the requirements of AMS-QQ-P-416A, Type I, Class 3 specification, i.e., the flash plating thickness is from about 0.0002 inch to about 0.0004 inch without the further, subsequent application of a chromate seal finish. Alternative pre-treatment processes may be utilized other than the cadmium flash plating process, such as the zinc-nickel (Zn—Ni) alloy flash coating process per the requirements of BAC 5637 specification. Following the pre-treatment, the component then is subjected to the preferred pre-coating process of applying Hi-Kote® 1 coating following the steps as previously claimed in the patents delineated above. Thus the cadmium flash process of the present invention is in strong contrast to the known cadmium plating that is necessarily applied to thicknesses of 0.0005 inch to 0.0008 inch, and is followed by a required subsequent chromate seal finish.

The present invention also relates to a corrosion-resistant aircraft structural ferrous-alloy component prepared by providing an aircraft structural component made from a ferrous-alloy precursor having a pre-determined heat-treatment temperature and subjecting the component to a flash plate pre-treatment. A curable organic coating material is provided having a non-volatile portion that is curable at about the predetermined ferrous-alloy heat-treatment temperature and is then applied to the component. The coated component is then heat-treated to substantially simultaneously cure the coating and the component substrate.

Still further, the present invention relates to a heat-treatable, precipitation-hardenable stainless steel ferrous-alloy aircraft structural component comprising a ferrous-alloy precursor having a predetermined heat-treatment temperature, a flash plate pre-treatment finish on the ferrous-alloy precursor and a curable, organic coating covering the flash plate. The organic coating is preferably made from a material having a non-volatile portion that is curable at about the pre-determined ferrous-alloy heat-treatment temperature, wherein the precursor and the coating are substantially simultaneously heat-treated.

The present invention also relates to an aircraft comprising a ferrous-alloy aircraft structural component comprising a ferrous-alloy precursor having a pre-determined heat-treatment temperature. The precursor is pre-treated with a flash plate and preferably followed by the application of a curable, organic coating made from a material having a non-volatile portion that is curable at about the predetermined ferrous-alloy heat-treatment temperature, wherein the precursor and the coating are substantially simultaneously heat-treated.

DETAILED DESCRIPTION OF THE PRESENT INVENTION

The present invention is directed to an improved method of pre-treating a heat-treatable, precipitation-hardenable stainless steel ferrous-alloy substrate by preparing the surface of the ferrous-alloy substrate prior to the ferrous-alloy substrate pre-coating process. Known patents disclose a ferrous-alloy pre-coating process as it is directly applied to ferrous-alloy substrates using any one of a variety of conventional surface treatments primarily to satisfy industry accepted surface cleaning requirements. See U.S. Pat. Nos. 6,274,200 and 6,494,972.

Figure 1:
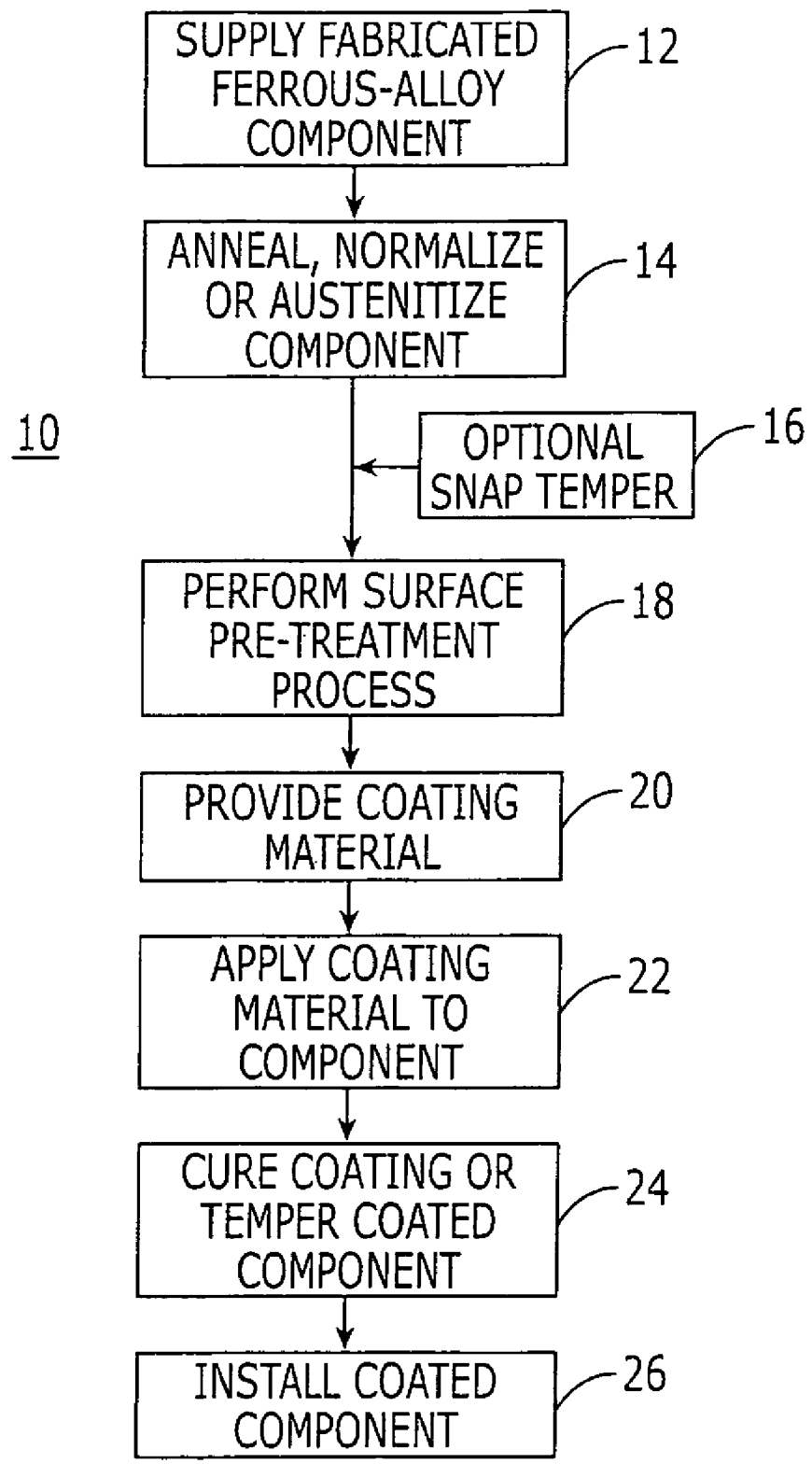
FIG. 1 presents a flow chart, which delineates the steps outlined by the process described in this disclosure including the new step of performing the specified surface pre-treatment operation.
Figure 2:
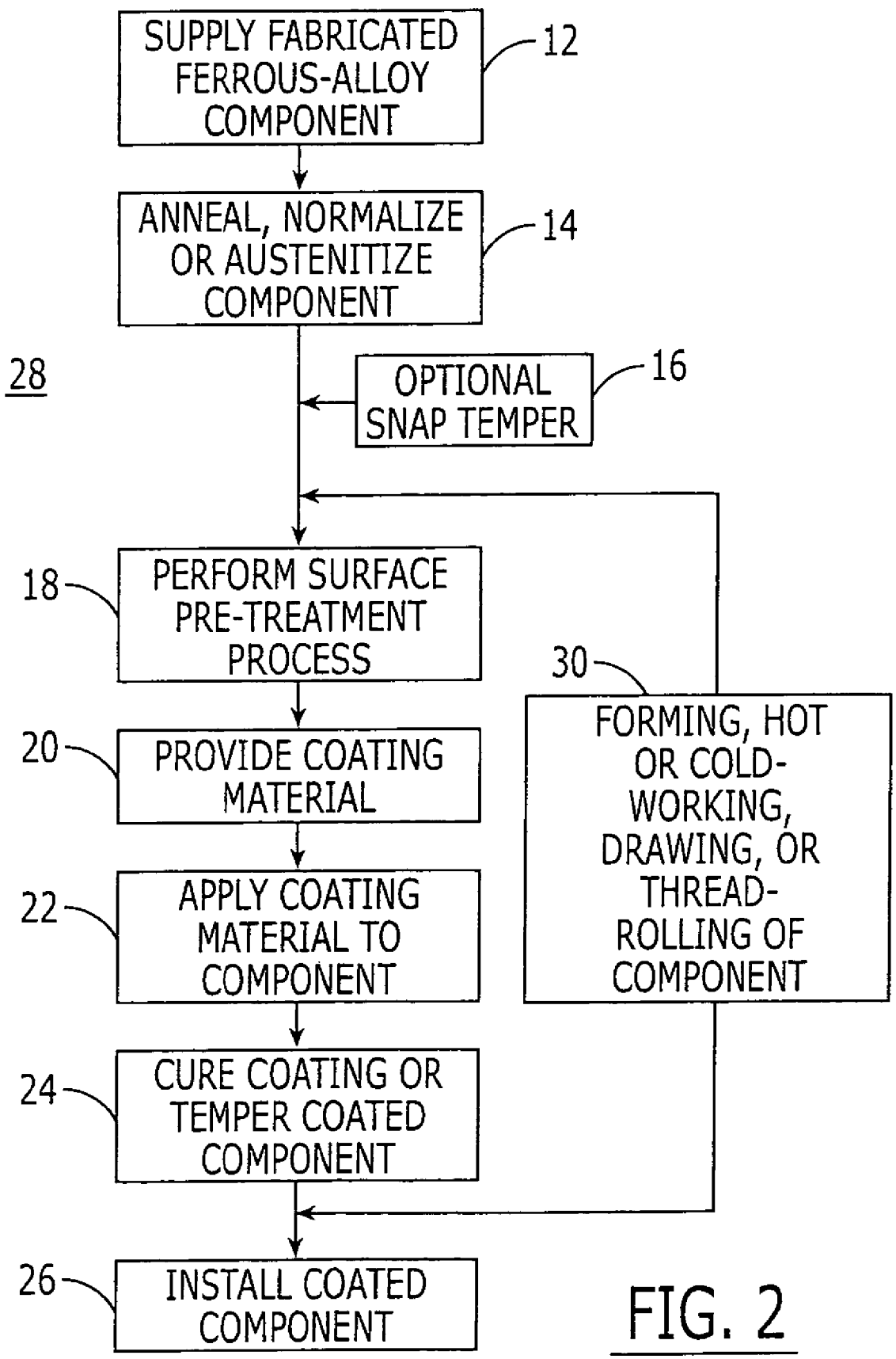
FIG. 2 outlines alternative embodiments, which include an optional forming or cold-working step either before or after the surface pre-treatment process or operation.

As shown by the process 10 outlined in FIG. 1 a ferrous-alloy component 12 is annealed, normalized or austenitized 14 followed by an optional snap tempering step 16. The flash plate surface pre-treatment 18 is then applied to the surface of the component. An organic coating corrosion-resistant material is provided 20 and then applied 22 to the flashed pre-treated component followed by a curing or tempering treatment 24 designed to substantially simultaneously treat both the component and the organic coating. The treated component is then ready for installation 26. FIG. 2 depicts a process 28 substantially similar to that shown in FIG. 1 with the addition of a further forming or fabrication step 30 to be included in the process 28. While the cold-working forming step 30 may optionally occur before or after the thermal treatment step 24, step 30 preferably occurs at some point before the thermal treatment step 24.

As shown by the process outlined in FIGS. 1 and 2, the coating material is applied to the pre-treated fastener in coating step 22. Any suitable coating process can be used, such as, for example, dipping, spraying, brushing, or a fluidized-bed method. In one preferred process or approach, the solution of coating material dissolved in a solvent is sprayed onto the pre-treated fasteners. Once the fasteners are coated, the solvent is removed from the as-applied coating by a quick drying or "flash cure" step, either at room temperature or slightly elevated temperature, so that the coated article is dried to a tack-free condition to enable handling. Preferably, evaporation of solvent is accomplished by flash cure or exposure to 200° F. for about two minutes. The coated component is still not suitable for service at this point, because the coating is not sufficiently cured and adhered to the pre-treated ferrous-alloy component and because the coating itself is not sufficiently coherent to resist corrosion or mechanical damage in service.

In the case of the preferred Hi-Kote® 1 coating, the as-sprayed coating was analyzed by EDS analysis in a scanning electron microscope. The heavier elements were present in the following amounts by weight: Al, 82.4 percent; Cr, 2.9 percent; Fe, 0.1 percent; Zn, 0.7 percent; and Sr, 13.9 percent. The lighter elements such as carbon and oxygen were detected in the coating but were not reported because the EDS analysis for such elements is not generally accurate.

The base, ferrous-alloy metal of the pre-treated fastener and the applied coating are together heated to a suitable elevated temperature in a cure/temper step 24, to achieve two results substantially simultaneously. In this single step, the ferrous-alloy material is treated to its final, desired strength state, and the coating is cured to its desired final cross-linked or bonded state.

Preferably, the temperature and time associated with the treatment of step 24 is selected to be that required to achieve the desired properties of the ferrous-alloy metal, as provided in the industry-accepted and proven process standards for that particular ferrous-alloy material. Surprisingly, this treatment is typically not that specified by the coating manufacturer and may not produce the most optimal cure state for the coating, but it has been determined that the thermal treatment of the metal is less forgiving of slight variations from the optimal treatment than is the curing treatment of the organic coating. That is, according to the present invention, the curing of the coating can sustain larger variations in time and temperature with acceptable results than can the heat-treatment process of the ferrous-alloy material. Contrary to expectations and manufacturer's specifications, the coating cured by the non-recommended procedures exhibits acceptable adhesion to the ferrous-alloy substrate. The coating also exhibits other desirable properties during the life of the coated component. Thus, the use of the recommended embrittlement relief thermal treatment process of the metal yields the optimal physical properties of the metal, and acceptable coating properties. In the case of one preferred A-286 heat-treatable, precipitation-hardenable stainless steel ferrous alloy and Hi-Kote® 1 coating, the preferred thermal treatment is the embrittlement relief treatment process of the A-286 alloy, namely about 4 hours to about 5 hours at about 350° F. to about 400° F.

Figure 3:
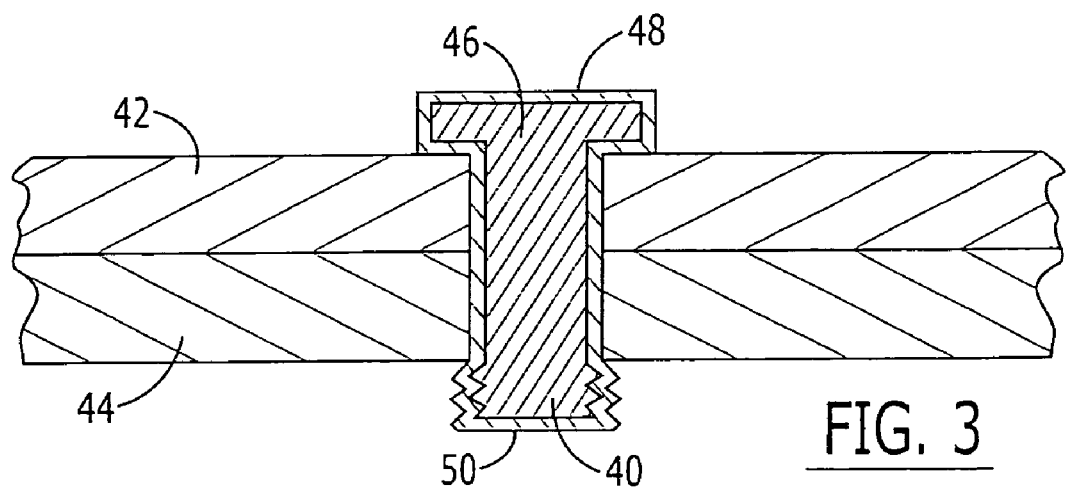
FIG. 3 is a schematic cross-sectional view of protruding-head fastener used to join two pieces, without a female component.
Figure 4:
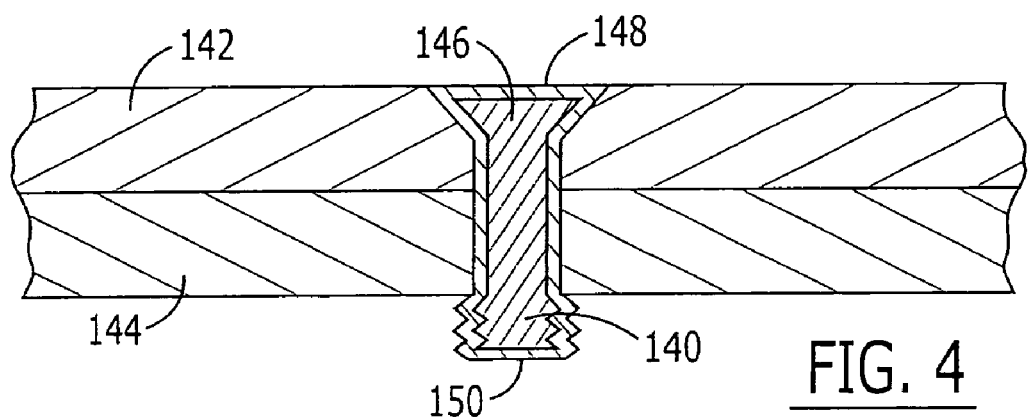
FIG. 4 is a schematic cross-sectional view of a flush-head fastener used to join two pieces, without a female component.
Figure 5:
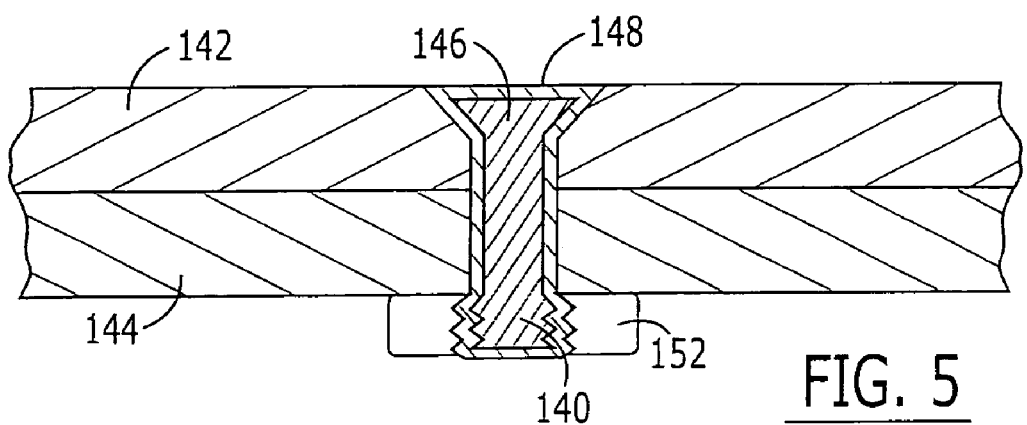
FIG. 5 is a schematic view of the flush-head fastener of FIG. 4, with a female component.

Thus, the thermal treatment procedure 24 involves a significantly different temperature than is recommended by the manufacturer for the organic coating. There was initially a concern that the higher temperature, beyond that required for the standard curing of the coating, would degrade the coating and its properties during service. Surprisingly, this concern proved to be unfounded. The final coating 48, shown schematically in FIGS. 3-5, is strongly adherent to the ferrous-alloy metal substrate and is also strongly coherent and cross-linked. In FIGS. 3-5, the thickness of the coatings 48 and 148 is exaggerated so that it is visible. In reality, the coating 48 (FIG. 3) is typically about 0.0003 inch to about 0.0005 inch thick after treating in step 24.

After coating and drying, the coated and fully-treated component is ready for the installation step, (See 28, FIGS. 1 and 2). The component is installed in the manner appropriate to its type. In the case of the fastener, such as the depicted bolt 40, the bolt is placed through aligned bores in the two mating pieces 42 and 44 placed into intimate contact, as shown in FIG. 3. As shown in FIG. 5, the remote protruding threaded end 150 of the bolt 140 has a female component, such as nut or collar installed so that the pieces 142 and 144 are mechanically captured between the pre-manufactured head 146 and a female component or threaded nut 152 of the bolt. FIG. 5 illustrates the threaded nut 140 for the case of the flush head, and the general assembly configuration of the bolts of the other types of bolts is similar. The coating 148 remains tightly adherent on the bolt even after assembly, as shown in FIG. 5.

As mentioned above, the installation step reflects one of the advantages of the present invention. If the coating were not applied to the fastener, it would be necessary to place a viscous wet-sealant material into the hole and onto the bolt prior to its installation, which in turn coats the contacting adjacent surfaces of the fastener and surrounding, adjacent structure. The wet-sealant material is potentially toxic to workers, messy, difficult to work with, and necessitates the use of extensive cleanup tools as well as exposing surfaces of the pieces 42 and 44 to caustic chemical solutions after installation of the fastener. Moreover, it has been observed that the presence of residual wet sealant inhibits the adhesion of later-applied paint and other topcoats applied over the fastener heads and surrounding structure.

The coating process of the present invention overcomes these problems confronted by the use of wet sealants. According to the process of the present invention, use of wet sealant is not needed or applied during fastener installation. Additionally, the later-applied paint or other top coats adhere well over the pre-coated fastener heads.

By performing a specific surface preparation of the ferrous-alloy material prior to the pre-coating process, adverse interaction between coating material and substrate is significantly reduced or eliminated. Instead of simply cleaning or stripping the component's surfaces prior to pre-coating, according to one aspect of the invention, using a cadmium flash plating, without a subsequent chromate seal, exhibits not only excellent additional corrosion protection but reduces or eliminates the interaction between the subsequently applied coating and the component's substrate. The process of applying an intermediate surface preparation, such as cadmium flash plating, in lieu of simply cleaning or stripping the substrate's surface prior to the pre-coating revealed superior results when compared to the known pre-coating process. In addition, it has also been discovered that a zinc-nickel (ZnNi) pre-plating surface preparation, also can mitigate effects of the coating and substrate interaction.

The present invention contemplates using any high-strength, ferrous-alloy material compatible with the selected aluminum-containing, organic corrosion-inhibiting coating formulation requiring a subsequent aging/curing period for the pre-coated component. The subsequent aging/curing period can be conducted at an elevated temperature commensurate with the ferrous-alloy material's thermal treatment protocol to facilitate curing of the coating. The coating thickness achievable by the present invention may vary slightly according to the preferred end-result characteristics of the coated component, but preferably coating thicknesses range from about 0.0003 inch to about 0.0005 inch.

One preferred embodiment of the invention relates to the preparation of fasteners, such as rivets and threaded bolts, and the following discussion will emphasize such components. The use of the invention is not limited to fasteners, and instead is more broadly applicable to a larger group of components. However, its use with fasteners offers particular advantages that will be discussed. The fasteners contemplated by the present invention include screws, bolts, pins, rivets, etc., which may have threads, and may have female mating components such as nuts, collars, lock washers, etc.

The process of the present invention is also useful for ferrous-alloy components used in aircraft construction such as, for example, landing gears, machined fittings, as well as other high-strength structural components such as fasteners and bearings. Fasteners are understood to mechanically join the various structural elements and subassemblies of aircraft. For example, a large transport aircraft, such as the C-17 typically includes over 1,000,000 total fasteners such as bolts, screws, and rivets. When such fasteners are formed from a ferrous-containing alloy, to insure protection from corrosion, each fastener must be coated with a suitable protective plating such as cadmium or chrome. In addition, to further facilitate corrosion protection, such fasteners are typically installed with a wet sealant that is toxic and requires special handling during application. The wet sealant further requires careful and expensive cleaning and special removal and handling as a hazardous waste.

Typical wet sealants include, two-part, manganese-cured, polysulfide sealants containing an additional quantity of soluble metallic chromates. Wet sealants require refrigeration storage until such time when they are required for use on the shop floor, which contributes to their costly use. These are flowable viscous materials which are applied by brush, spatula, roller or extrusion gun. Examples are P/S 1422 or 870 C corrosion-inhibiting sealants produced by PRC-Desoto, Glendale, Calif. By contrast the process of the present invention pre-treats the components first with a surface pre-treatment in the form of a flash plate, preferably a cadmium flash plate without any chromate sealant, followed by the pre-coating process, which applies a corrosion-resistant organic coating. This pre-coating process obviates the need for the use of wet sealant during the fastener installation and component assembly process.

The ferrous-alloy components of the present invention achieve their full, required strength and other metallurgical properties produced by a thermal treatment as well as curing of the coating. Achieving a specified strength level of the substrate is important, because users of the components, such as the customers of aircraft, will not permit a sacrifice of mechanical performance in order to achieve improved corrosion protection. In the past, they have required both acceptable mechanical performance and also the use of various harsh full-up production plating treatments in addition to the use of wet-sealant to achieve acceptable corrosion protection. In the present approach, on the other hand, the aircraft structural components have both acceptable mechanical performance and a less toxic and costly method for providing acceptable corrosion protection. It is known to those skilled in the field of metals finishing, and in particular plating processes, that minimal benefits for wear and corrosion protection are associated with relatively thin, flash plate finishes. Yet the true benefit as incorporated in the processing methodology of the present invention is the ability that is afforded to facilitate the more beneficial aspects of the subsequent pre-coating process. In other words, the general use of various relatively thin, flash plate finishes has shown to have greatly reduced benefits from wear resistance and corrosion protection standpoints among other considerations. However, when the pre-treatment flash plating process is used in conjunction with the subsequent application of a corrosion-inhibiting coating, as is the case in the pre-coating process of the present invention, superior corrosion protection is achieved, while mitigating the adverse interaction between the coating and substrate, which the flash-plate pre-treatment is intended to achieve.

With regard to aircraft bearings and fasteners, the elimination of the requirement for the wet-sealant installation approach for more than 1,000,000 fasteners in a large cargo aircraft offers a significant cost savings of several hundreds of thousands of dollars per aircraft. The elimination of the use of wet sealants also improves the overall quality and workmanship in the fastener installation, as there is no possibility of missing or overlooking some of the fasteners as the wet sealant is applied. Further, the pre-coated, fully-treated fasteners provide equivalent or enhanced protection from corrosion during service than the uncoated, wet-installed fasteners.

The preferred bolts, such as those represented in FIGS. 3-5, preferably are manufactured from a heat-treatable, precipitation-hardenable stainless steel ferrous alloy material. As used herein, "ferrous alloy" or "ferrous-containing alloy" means that the material has more than about 50 percent by weight iron. Typically, the ferrous-alloy material has at least about 50 percent by weight of iron, with the balance being alloying elements and a minor amount of impurities. Alloying elements are added in precisely controlled amounts to modify the properties of the ferrous-alloy material as desired. Alloying elements that are added to iron to modify its properties include, for example, carbon, manganese, silicon, nickel, chromium, and molybdenum.

In one embodiment, the ferrous-alloy material is a heat-treatable, precipitation-hardenable stainless steel material. The component is first fabricated to a desired shape, for example, a fastener such as a bolt. In order to impart strength to the component, the component must then be heat-treated. In the solution heat-treating or austenitizing/hardening process, the component is heated to an elevated temperature where a Face-Centered-Cubic phase called "austenite" is formed. While still at this elevated temperature, the component is rapidly quenched, reverting the austenite to a Body-Centered-Tetragonal phase called "martensite." Untempered martensite is a hard, brittle phase and must be softened by a process called "tempering." In the tempering process, the austenitized and quenched component is subjected to an elevated temperature, which is much lower than the austenitizing temperature. This tempering process softens the component and imparts toughness.

Tempering must occur shortly after the austenitizing and quenching procedure, or fissures or cracking may occur leading to component failure. The present invention contemplates providing, as a tempering step, the necessary and required hydrogen embrittlement relief (not specifically just conventional "tempering" of the metal substrate) to cure the metal as well as the subsequent organic coating. To achieve the desired hydrogen embrittlement, the duration for the treatment will range from about 4 to up to about 9 hours depending upon the alloy selected. Further, if the part must be processed (i.e., straightened, coated, etc.) prior to a full temper, the component can be given an intermediate and abbreviated "snap" temper. This snap temper softens the ferrous alloy slightly and reduces the likelihood of cracking.

According to one embodiment of the present invention, all parts having hardness, i.e. Rockwell "C" scale, of 36.0 or greater are preferably embrittlement relieved following pickling, plating, or electrolytic cleaning. Aerospace components, such as fasteners, typically fall into this hardness category due to strength requirements. The subsequent thermal treatment or baking allows for release of hydrogen.

The ingress of hydrogen into a component, an event that can seriously reduce the ductility and load-carrying capacity, can result in cracking and catastrophic brittle failures at stresses well below the yield stress of susceptible materials. Hydrogen embrittlement occurs in a number of forms, but the common features are an applied tensile stress and hydrogen dissolved in the metal. An example of hydrogen embrittlement is cracking of hardened steels when exposed to conditions, which inject hydrogen into the component. Presently, the phenomenon is not completely understood and hydrogen embrittlement detection, in particular, is problematic. Further, hydrogen embrittlement does not affect all metallic materials equally. The most vulnerable materials are high-strength stainless steels, titanium alloys, and aluminum alloys.

Sources of hydrogen causing embrittlement have been encountered in the making of steel, in processing parts, in storage or containment of hydrogen gas, and related to hydrogen as a contaminant in the environment that is often a by-product of general corrosion. Hydrogen entry, the obvious pre-requisite of embrittlement, can be facilitated in a number of ways. One example is by manufacturing operations, such as welding, electroplating, pickling, etc. If a material subject to such operations is susceptible to hydrogen embrittlement, then a final, baking thermal or heat treatment to expel any hydrogen is required. Another example is a by-product of a corrosion reaction, such as in circumstances when the hydrogen production reaction acts as the cathodic reaction since some of the hydrogen produced may enter the metal in atomic form rather than evolving as a gas into the surrounding environment.

Hydrogen diffuses along the grain boundaries and combines with the carbon, which is alloyed with the iron, to form methane gas. The methane gas is not mobile and collects in small voids along the grain boundaries where it builds up enormous pressures that initiate cracks. If the metal component is under a high tensile stress, brittle failure can occur. At normal room temperatures, the hydrogen atoms are absorbed into the metal lattice and diffused through the grains, tending to gather at inclusions or other lattice defects. If stress induces cracking under these conditions, the path is transgranular. At high temperatures, the absorbed hydrogen tends to gather in the grain boundaries and stress-induced cracking is then intergranular. The cracking of martensitic and precipitation hardened steel alloys is believed to be a form of hydrogen stress corrosion cracking that results from the entry into the metal of a portion of atomic hydrogen that is produced in the following corrosion reaction.

To address the problem of hydrogen embrittlement, emphasis is placed upon controlling the amount of residual hydrogen in the steel, controlling or limiting the amount of hydrogen pick-up in processing, developing alloys with improved resistance to hydrogen embrittlement, developing low or no embrittlement plating or coating processes, and restricting the amount of in-situ hydrogen introduced during the service life of a component.

Collectively, all of the processing steps leading to the strengthening of the material or component are generally termed "heat-treating" or "thermal treatment", wherein the component is subjected to one or more periods of exposure to an elevated temperature for a duration of time, with heating and cooling rates selected to aid in producing the component's desired final, metallurgical properties. The temperatures, times, and other parameters required to achieve particular properties are known to those skilled in the metallurgy field and are available in reference documents for standard ferrous-alloy materials.

A preferred, specific heat-treatable, precipitation-hardenable stainless steel ferrous-alloy material for fastener applications is the A-286 alloy (UNS K66286) per AMS5731, which has a nominal composition of 0.03 to 0.05 percent carbon, 15.0 percent chromium, 26.0 percent nickel and 1.25 percent molybdenum, with the balance being iron plus minor impurities. Other contemplated heat-treatable, precipitation-hardenable stainless steel ferrous-alloys include, but are not limited to, 18-8, 17-4 PH, 17-7 PH, 15-5 PH, PH 13-8Mo, PH 15-7Mo, Custom 450, and Haynes 556 series heat-treatable precipitation-hardenable, stainless steel ferrous alloys. The A-286 alloy is available commercially from several companies. After fabricating the alloy to the desired shape such as a fastener like those shown in FIGS. 3-5, the A-286 alloy may be fully annealed, normalized and stress relieved. This state is usually obtained following fabricating including machining, forging, or otherwise forming the fastener into the desired shape. Following these steps, the ferrous-alloy material is hardened or austenitized, quenched and, if necessary, "snap" tempered. This condition is termed the "untreated state" herein, as it precedes the final, fall-tempering heat-treatment soak required to optimize the strength and other properties of the material. The component may be subjected to multiple forming operations and periodically re-annealed as needed, prior to the strengthening or hardening, heat-treatment processes.

A coating material is provided 20, preferably in solution so that it may be readily and evenly applied. The usual function of the coating material is to protect the base metal to which it is applied from corrosion, including, for example, conventional electrolytic corrosion, galvanic corrosion, and stress corrosion. The coating material is a formulation that is primarily of an organic composition, but which may contain additives to improve the properties of the final coating. In one preferred embodiment, the coating is initially dissolved in a carrier or solvent liquid so that it can be applied to a substrate. After applying, the coating material is curable to effect structural changes within the organic component, typically cross-linking of the organic molecules to improve the adhesion and cohesion of the coating. The coating layer 48, 148 on the preferred fastener is shown in FIGS. 3-5.

Such a curable coating is distinct from a non-curable coating, such as a lacquer, which has different properties and is not as suitable for the present, corrosion-protection application. With a non-curable coating such as a lacquer, there is no need to heat the coated article to elevated temperatures for curing. Thus, the over-aging problems associated with the use of curable-coating materials, and which necessitate the present invention, simply do not arise. It is further understood that optional industry accepted cleaning steps may be required to prepare the base metal for the flash plate. Such cleaning procedures are those well known to those skilled in the coating field and include the use of solvents, acids, alkalines, and mechanical methods.

The present process contemplates a number of curable organic coating materials. A typical and preferred coating material has a phenolic resin mixed with one or more plasticizers, other organic components such as polytetrafluoroethylene, and inorganic additives such as aluminum powder and/or strontium chromate. These coating components are preferably dissolved in a suitable solvent present in an amount to produce a desired consistency based upon the desired end use.

For the coating material just discussed, one useful preferred solvent is a mixture of ethanol, toluene, and methyl ethyl ketone (MEK). A typical, sprayable coating solution has about 30 percent by weight ethanol, about 7 percent by weight toluene, about 45 percent by weight methyl ethyl ketone (MEK) as the solvent, about 2 percent by weight strontium chromate, and about 2 percent by weight aluminum powder, with the balance being phenolic resin and plasticizer. Optionally, a small amount of polytetrafluoroethylene may be added. Such a product is available commercially as "Hi-Kote 1" from Hi-Shear Corporation, Torrance, Calif. The coating material has a standard elevated temperature curing treatment of 1 hour at 400° F.±25° F., as recommended by the manufacturer.

The following examples serve only to further illustrate aspects of the invention and should not be construed as limiting the present invention.

EXAMPLE

A comparative 2000 hour salt spray exposure test performed on A-286 stainless steel Hi-Set® fasteners having various surface preparation methods employed prior to the application of Hi-Kote® 1 aluminum pigmented coating. Hi-Kote®1 is a phenolic resin-based aluminum coating as described above, and has been demonstrated to possess excellent corrosion protection when subjected to 2000-hour salt spray corrosion evaluations, as well as high temperature resistance (to 400° F.), excellent resistance to fuel, hydraulic fluids, solvents when applied on a wide variety of metallic surfaces.

The salt spray evaluation testing was performed in accordance with ASTM B117 apparatus and standard test method procedures. Aluminum-alloy test speciment assemblies, each containing six fastener installations, were placed at a 15-degree angle to the horizontal inside the salt spray test chamber for a period of 2000 hours.

All fasteners used in the evaluation were selected from the same manufacturing lot of Hi-Set® fasteners and represented standard manufacturing processes, which included the application of Hi-Kote® 1 coating onto A-286 stainless steel material for the control specimens. Additional derivative samples were processed with modifications to the A-286 material preparation prior to the application of Hi-Kote®1 coating, which included various plating alternatives as well as wet-sealant installation of the standard production Hi-Set® fasteners. A separate test coupon assembly containing installations of a different type of production Hi-Kote®1-coated titanium-alloy material fastener was selected for a comparison baseline of corrosion prevention results and characteristics.

The test results indicated conclusively that the pre-coated A-286 stainless steel HSR217 Hi-Set® fasteners, which employed the pre-treatment cadmium flash plate finish prior to the application of the Hi-Kote® 1 coating, exhibited excellent corrosion protection performance. The pre-treatment process of applying the cadmium flash plate finish on the fasteners in lieu of stripping standard, full-up production cadmium plating prior to pre-coating with Hi-Kote® 1 revealed superior results when compared to results for wet-installed Hi-Set® fasteners pre-coated with Hi-Kote® 1 coating on a standard prepared A-286 base material as well as the production titanium-alloy fasteners pre-coated with Hi-Kote® 1.

The A-286 HSR217AP6-9 Hi-Set® fasteners processed with the pre-treatment cadmium flash plate finish prior to being pre-coated, out-performed the wet-installed, standard processed A-286 material Hi-Set® fasteners pre-coated with Hi-Kote® 1. The wet-sealant installation was performed in accordance with DPS2.50-17, Type 18.

Furthermore, the Hi-Set® A-286 fasteners processed with the pre-treatment cadmium flash plate finish and subsequently pre-coated with Hi-Kote® 1 performed equivalently in protecting against exfoliation and pitting corrosion to that exhibited by the dry-installed, standard production titanium-alloy fasteners, which were pre-coated with Hi-Kote® 1.

Although a particular embodiment of the invention has been described in detail for purposes of illustration, various modifications and enhancements may be made without departing from the spirit and scope of the invention. Accordingly, the invention is not to be limited except as by the appended claims.

That which is claimed:

1. A corrosion resistant aircraft structural ferrous-alloy component prepared according to a method comprising the steps of:
    providing an aircraft structural component made from a ferrous-alloy precursor having a pre-determined heat-treatment temperature;
    providing a flash plate pre-treatment without a subsequent chromate seal;
    subjecting the component to the flash plate pre-treatment without a subsequent chromate seal, wherein subjecting the component to the flash plate pre-treatment thereby provides a pre-treated surface on the component;
    providing a curable organic coating material having a non-volatile portion that is curable at about the pre-determined ferrous-alloy heat-treatment temperature;
    applying the organic coating material to the component following the flash plate pre-treatment and without a chromate seal to form a coated component, wherein the curable organic coating material is applied directly onto the pre-treated surface provided by the flash plate pre-treatment; and
    curing the coated component to the pre-determined temperature, wherein the organic coating applied to the ferrous alloy precursor and the ferrous alloy precursor are heat-treated substantially simultaneously.

2. The component of claim 1 wherein the ferrous-alloy precursor is a heat-treatable, precipitation-hardenable stainless steel.

3. The component of claim 1 wherein the curable organic coating material is an organic, phenolic resin mixed with at least one plasticizer and an inorganic additive selected from the group consisting of aluminum powder and strontium chromate.

4. The component of claim 1, wherein the coating material is dissolved in a solvent selected from the group consisting of ethanol, toluene, methyl ethyl ketone (MEK), and mixtures thereof.

* * * * *

UNITED STATES PATENT AND TRADEMARK OFFICE
CERTIFICATE OF CORRECTION

PATENT NO. : 7,655,320 B2  Page 1 of 1
APPLICATION NO. : 10/982938
DATED : February 2, 2010
INVENTOR(S) : Keener et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1309 days.

Signed and Sealed this

Twenty-third Day of November, 2010

David J. Kappos
*Director of the United States Patent and Trademark Office*